United States Patent [19]
Pauza

[11] Patent Number: 5,910,347
[45] Date of Patent: Jun. 8, 1999

[54] PRECISION MOLDED CYLINDERS

[75] Inventor: William Vito Pauza, Palmyra, Pa.

[73] Assignee: The Whitaker Corporation, Wilmington, Del.

[21] Appl. No.: 08/677,060

[22] Filed: Jul. 9, 1996

[51] Int. Cl.[6] .................... H01R 13/405; B29D 23/00
[52] U.S. Cl. ............... 428/36.9; 428/36.92; 439/63; 439/578; 439/585; 439/606; 439/736; 138/DIG. 11
[58] Field of Search ................... 439/736, 63, 578–585, 439/606; 428/36.9, 36.91, 36.92, 35.7; 138/DIG. 11

[56] References Cited

U.S. PATENT DOCUMENTS

| | | | |
|---|---|---|---|
| 4,464,263 | 8/1984 | Brownell | 210/484 |
| 4,655,986 | 4/1987 | Cothran et al. | 428/36.9 |
| 4,725,463 | 2/1988 | Baumber et al. | 428/36.9 |
| 4,834,487 | 5/1989 | Abendschein et al. | 350/96.2 |
| 4,931,326 | 6/1990 | Weil | 428/36.9 |
| 5,087,493 | 2/1992 | Wang | 428/36.9 |
| 5,216,863 | 6/1993 | Nessa et al. | 428/36.9 |
| 5,312,658 | 5/1994 | Griffith | 428/36.9 |
| 5,480,689 | 1/1996 | Shepard et al. | 428/36.9 |
| 5,503,885 | 4/1996 | Anderson | 428/35.7 |
| 5,580,622 | 12/1996 | Lockshaw et al. | 428/36.9 |
| 5,688,570 | 11/1997 | Ruttinger, Sr. | 428/36.91 |

FOREIGN PATENT DOCUMENTS

| | | |
|---|---|---|
| 0414495 | 2/1991 | European Pat. Off. . |
| 1351829 | 5/1964 | France . |
| 5-172288 | 12/1991 | Japan . |

OTHER PUBLICATIONS

Derwent Publications Ltd., Abstract #XP002043141, Jul. 1993, Section Ch, Week 9332.

International Search Report, PCT/US 97/12287, Sep. 7, 1997, pp. 1 & 2.

English Translation of JP (5172288) abstract. D1 =DATABASE WPI, Section Ch, Week 9332, Derwent Publications Ltd., London, GB: Class A 35, AN 93–253480, XP002043141 Dec. 1991.

*Primary Examiner*—Rena L. Dye
*Attorney, Agent, or Firm*—Salvatore Anastasi

[57] ABSTRACT

This application discloses a precision molded cylinder having a substantially cylindrical body. Chordal sections are formed in the body to create a small void between the chordal sections and an opening into which the cylinder is placed. The chordal sections are disposed adjacent to parting lines of the mold such that any flashing resulting from the molding process will project from the chordal sections and not interfere with the fit between the cylinder and the opening.

5 Claims, 4 Drawing Sheets

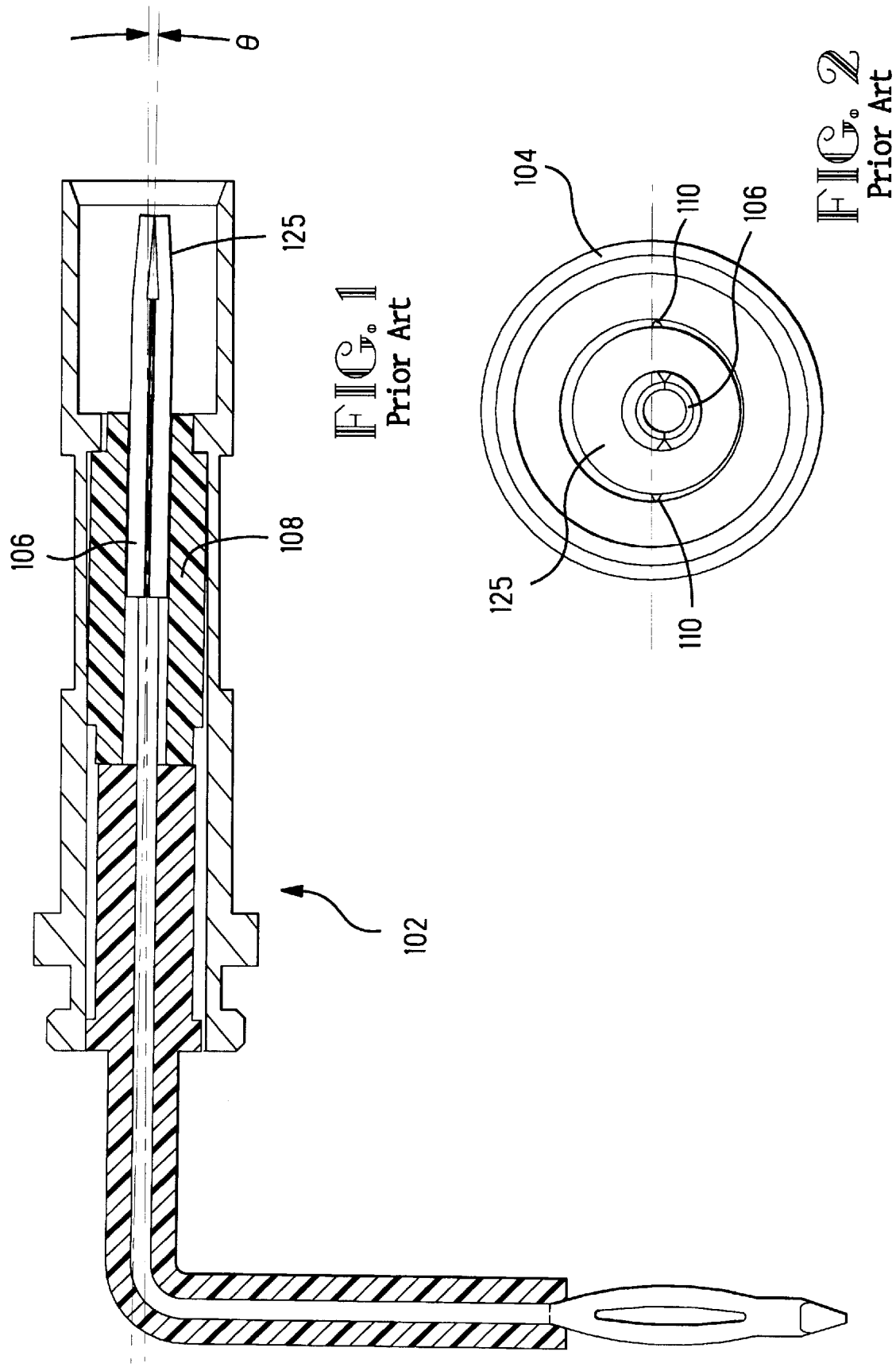

PRECISION MOLDED CYLINDERS

FIELD OF THE INVENTION

This invention is related to the general art of precision molding, and more particularly to the precision overmolding of contacts to be used in an electrical connector.

BACKGROUND OF THE INVENTION

Due to the advances in electronics technology, there is an ever increasing need for miniaturized components and assemblies. This results in a need to fabricate printed circuit boards which are smaller than ever before required. Electrical connectors for connecting circuit boards to other circuit boards in such devices are required to be accordingly smaller. One example of such an electrical connector is a daughter board connector which is typically disposed on the edge of a printed circuit board and mates with a complimentary motherboard connector in a right angle orientation. The daughter board may contain a plurality of these electrical connectors along its mating edge. There is typically a large number of very tightly spaced connections that are required to be made between the daughter board and the mother board through the electrical connectors.

As the sizes of the boards and connectors are reduced, the precision required in order to properly align the mating connectors is greatly increased. If precise alignment is not achieved, a condition known as stubbing occurs between the contacts of the electrical connectors. Stubbing can occur as a result of misalignment between contacts within an electrical connector. While the housings of each daughter board connector and mother board connector may be perfectly aligned, the associated electrical contacts mounted therein may be out of alignment with each other and will jam against their respective complimentary contacts upon mating. Since the contacts are very small, they are delicate and subject to breaking when stubbing occurs. A problem therefore exists in that as electrical connectors are required to be smaller and more densely populated with contacts, precision alignment between mating contacts is difficult to achieve. This problem is exaggerated by the fact that an overmolded contact will unavoidably contain excess flashing as a result of the seams in the mold.

The cavity into which this overmolded contact must be placed has a diameter which is large enough to accept the overmolded contact with the additional flashing on its periphery. Because it is necessary to allow for this additional space, there will be some play between the overmolded contact and its associated housing cavity. A small degree of play between the housing cavity and the overmolded contact will result in a deflection of the contact at the mating end which extends from the housing. For example, a very small amount of flashing appearing on the edge surface of an overmolded contact will result in a deflection at the tip of the contact. This deflection is not acceptable and will result in stubbing problems in high density connector.

While flashing is not typically a problem in larger parts because it is a small percentage of the overall surface area of the part, as the surface area of the part becomes smaller the flashing becomes a larger percentage of that surface area thus contributing greater to any misalignment thereof. The flashing therefore creates a problem in that it requires the associated cavity to be larger than necessary in order to achieve precise alignment between the electrical contact and the housing.

An example of a known overmolded contact 102 is shown in FIGS. 1 & 2. Here the center contact 106 is overmolded and placed into an outer contact 104. If the center contact 106 is slightly out of position with respect to the outer contact 104, stubbing will occur upon mating with a complementary contact. The concentric relationship between the center contact 106 and the outer contact 104 is lost due to the play between the overmolded dielectric 108 and the outer contact 106. This problem can be addressed by trimming the flashing 110 from the dielectric 108 and reducing the cavity diameter of the outer contact 104 to achieve precise concentricity between the inner and outer contacts 106,104. Because of the size of the molded parts, approximately 1/16 in. in diameter, and small amount of flashing 110 that usually exists, about 0.002 to 0.004 in. high, the trimming process is expensive and not always effective. A deflection as indicated by "θ" in FIG. 1 will result to cause a stubbing condition.

SUMMARY OF THE INVENTION

It is therefore an object of this invention to provide a method of overmolding a center contact such that any flashing associated therewith does not interfere with precision alignment between the center contact and its surrounding housing or outer contact. The objects of this invention are achieved by providing an overmolded contact having a partially cylindrical shape such that flash lines are disposed along a flat section of the partial cylinder. This flat section is profiled to be inside the outer diameter of the cylinder

BRIEF DESCRIPTION OF THE DRAWINGS

The invention will now be described by way of example with reference to the following figures of which:

FIG. 1 shows a cross sectional view of a prior art coaxial contact having an overmolded center conductor.

FIG. 2 shows a front end view of the prior art coaxial contact as shown in FIG. 1.

DETAILED DESCRIPTION OF THE INVENTION

Figure 3:
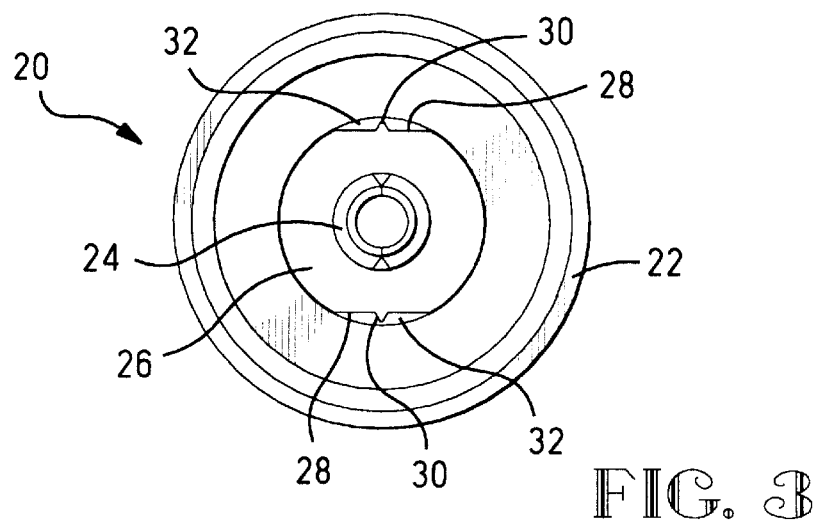
FIG. 3 shows a front end view similar to that of FIG. 2 of the coaxial contact according to this invention.
Figure 4:
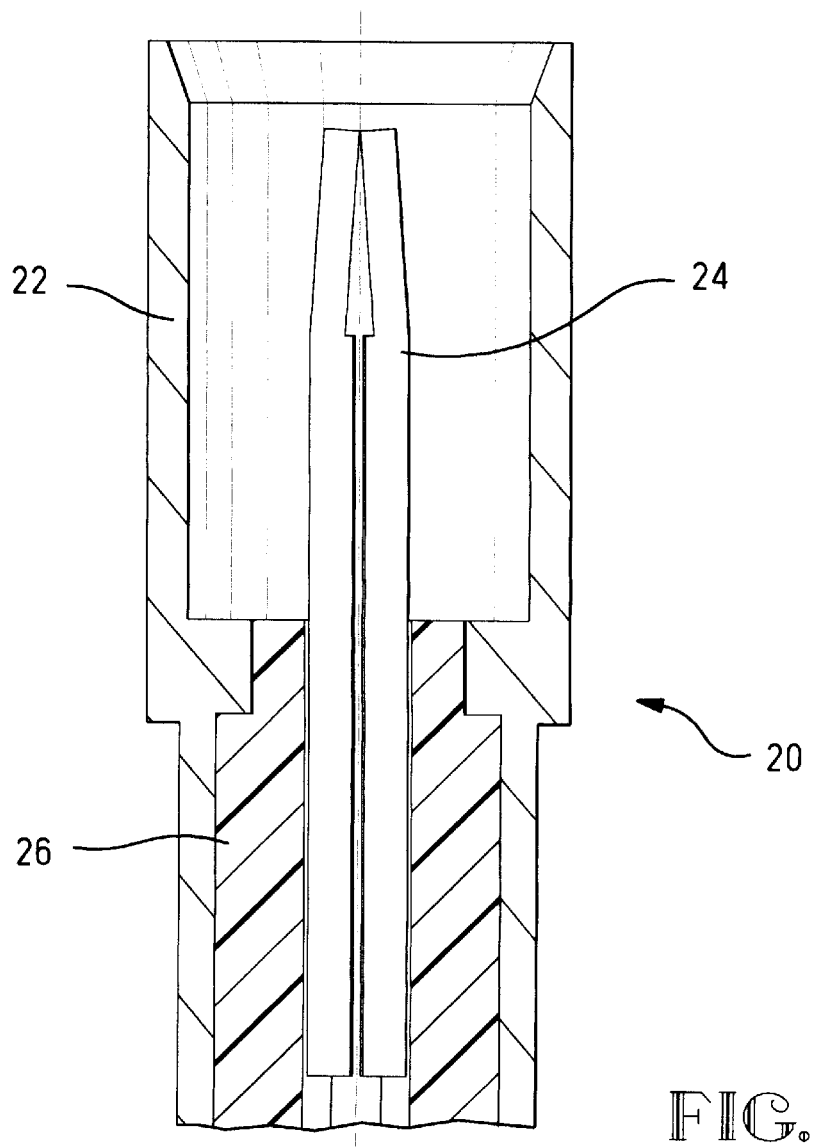
FIG. 4 shows a cross sectional view of the coaxial contact similar to FIG. 1 for the contact according of this invention.

Referring to FIGS. 3 & 4, a coaxial contact element 20 is shown having a center contact 24, an overmolded dielectric 26 and an outer contact 22. To achieve very precise concentricity between the center contact 24 and the outer contact 22, the overmolded dielectric 26 is generally cylindrically shaped having flat sections 28. The flat sections 28 are formed such that their surfaces are inside the outer diameter of the overmolded dielectric 26. These flat sections 28 are formed in the area where sections of a mold which form the dielectric will meet. As in all molding operations, parting lines flashing 30 will appear at the seams of the mold. The flashing 30 is disposed such that it is generally perpendicular to the flat surfaces 28 and does not extend beyond the outer diameter of the central dielectric 26.

This allows for a very tight interference fit between the outer dielectric 26 and the outer conductor 22 without interference between the flashing 30 and the inner diameter of the outer conductor 22. Because of this tight fit, very precise concentricity will result between the center contact 24 and the outer contact 22.

The overmolding configuration shown here is intended to eliminate the need for trimming while permitting dimensional tolerances for precision fit conditions. The flat features can be incorporated into each half of the mold tooling resulting in a void or space 32 between the dielectric 26 and the outer conductor 22. This space 32 can accommodate the small amount of flashing 30 from the molding.

Figure 6:
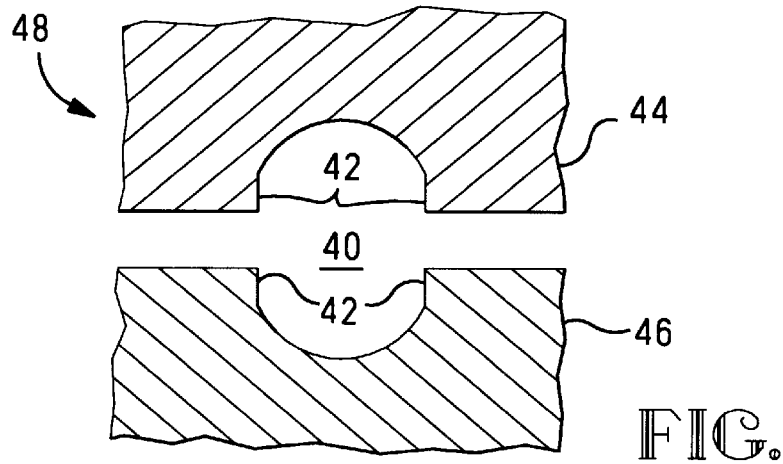
FIG. 6 shows a cross sectional view of a mold used to form the precision molded cylinder according to this invention.
Figure 7:
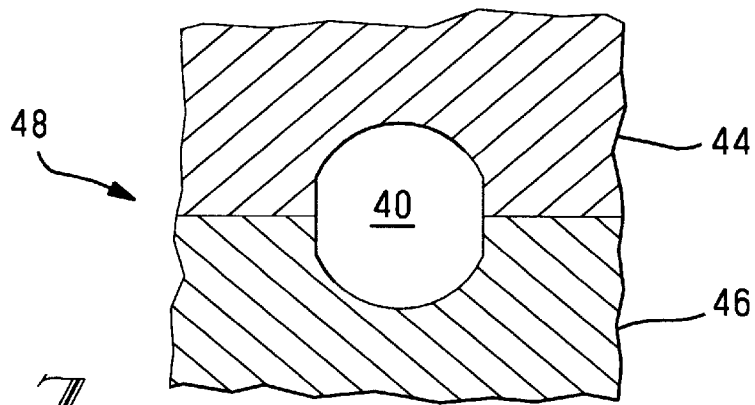
FIG. 7 shows a cross sectional view of the closed mold just prior to filling.
Figure 8:
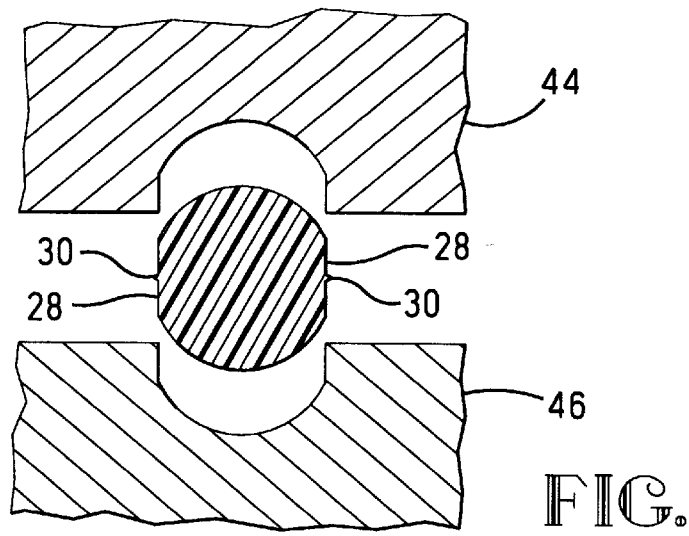
FIG. 8 shows a cross sectional view of the open mold after the molded cylinder has been formed.

A method of making the precision molded cylinder according to this invention will now be described in greater detail with reference to FIGS. 6–8. First the mold cavity 40 is designed to have flat or chordal sections 42 at points adjacent to areas of the cavity 40 where each mold part 44, 46 meet. These sections 42 may be formed with a slight draft or angled surface to facilitate separation of the mold 48 for removal of the molded part. The mold 48 is closed by urging each of the mold parts 44, 46 together to form the mold cavity 40. The mold cavity 40 is then filled with the molding material and after cooling the mold parts 44, 46 are separated. Flashing 30 will result at the parting lines of the mold parts 44, 46. Because of the chordal sections 42 formed in the mold parts 44, 46, the resultant flashing 30 will not project beyond the circumference of the precision molded cylinder.

Figure 5:
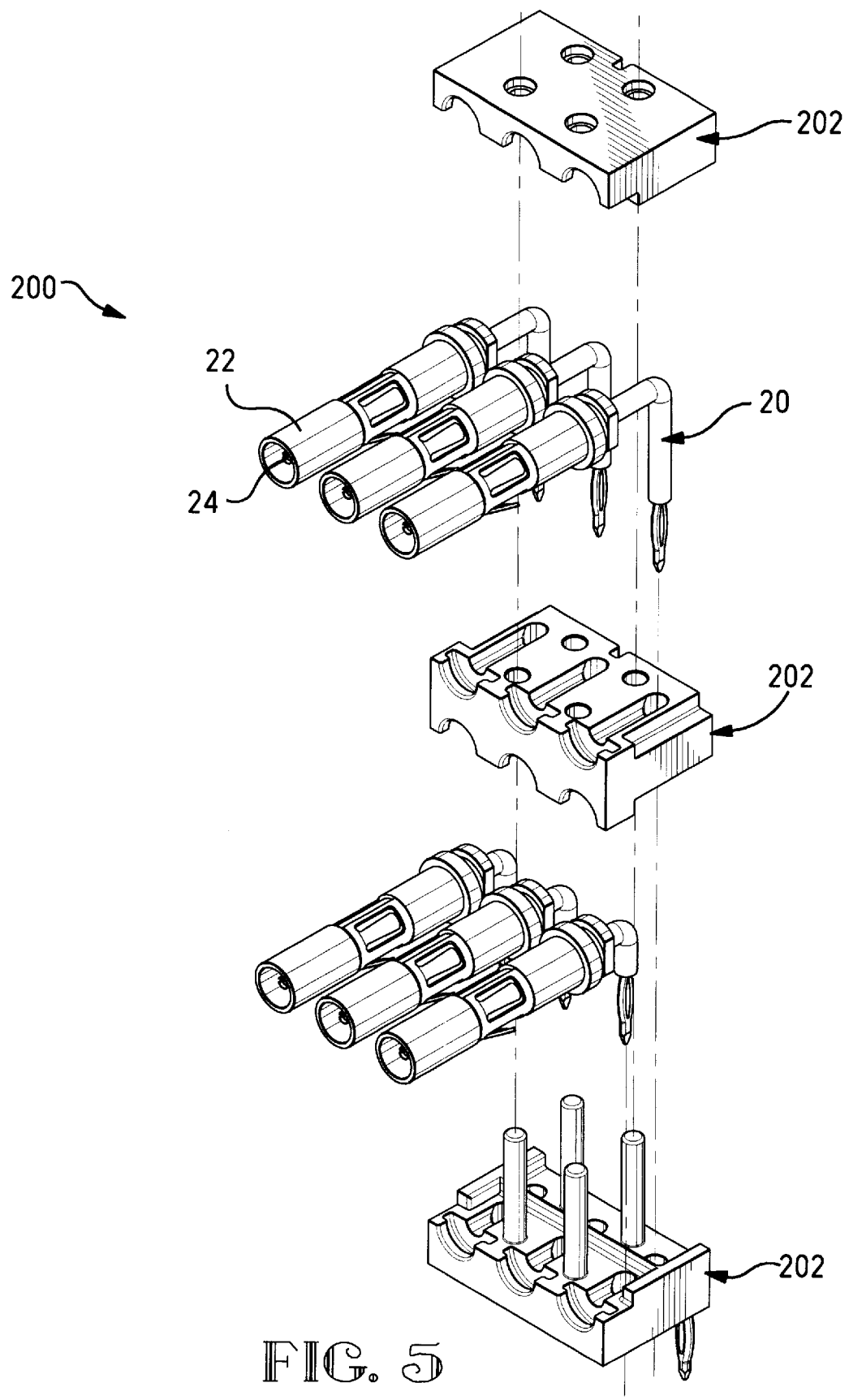
FIG. 5 shows a connector utilizing contacts manufactured by the method according to this invention.

As shown in FIG. 5, the contact element 20 of the present invention may be utilized, for example, in a right angle stacked board-mounted coaxial connector 200. This example shows each contact element 20 having the overmolded center contact 24 arranged in a common shield member 202 in order to form the connector 200. Achieving near precise concentricity between the center contact 24 and the outer contact 22 allows for a precisely aligned assembly such that no stubbing will occur between the numerous contacts and their respective mating contacts. It should be noted that while these contact elements 20 are shown here in an array of six contact elements 20 per connector, 200 larger arrays may be formed because of the increased precision which is achievable by the methods described herein.

The advantage of this invention is that near perfect concentricity will be achieved without interference due to projections of flashing 30 appearing on an outer surface of an overmolded contact. A further advantage is that such flashing 30 does not have to be trimmed from the overmolded center contact 24 in order to achieve near perfect concentricity.

While this concept is shown here embodied in an right angle coaxial high density connector, it should be understood that this teaching may be applied in any application where it is desirable to achieve precise alignment between a molded part such as a cylinder, and a surrounding hollow part such as a hollow cylinder.

I claim:

1. A molded cylinder comprising:

an outer circumferential cross section profiled to be partially circular, the circumferential cross section having at least one chordal section extending between and within the circumferential cross section, and;

a flashing projection extending along the chordal section.

2. The molded cylinder body as recited in claim 1 further comprising an electrical contact disposed within the circumferential cross section.

3. A molded cylinder designed to precisely fit into a cylindrical cavity comprising:

a molded cylinder body being profiled to have flat sections and flashing projections which extend therefrom, said flashing projections extending into a void formed between the flat section and the cylindrical cavity into which the molded cylinder is placed, and;

an electrical contact disposed inside the molded cylinder.

4. A molded cylinder as recited in claim 3 wherein the molded cylinder is a sleeve having a passage therein for receiving the electrical contact.

5. A molded cylinder as recited in claim 3 wherein the molded cylinder is overmolded onto the electrical contact.

* * * * *